(12) United States Patent
Lin

(10) Patent No.: US 9,574,930 B2
(45) Date of Patent: Feb. 21, 2017

(54) SMART ELECTRONIC FLOAT, SYSTEM AND METHOD FOR INTEGRATING MOBILE PERSONAL FISHING INFORMATION, AND COMPUTER PROGRAM PRODUCT

(71) Applicant: Insyde Software Corp., Taipei (TW)

(72) Inventor: Wen-Ming Lin, Taipei (TW)

(73) Assignee: INSYDE SOFTWARE CORP., Taipei (TW)

( * ) Notice: Subject to any disclaimer, the term of this patent is extended or adjusted under 35 U.S.C. 154(b) by 90 days.

(21) Appl. No.: 14/622,491

(22) Filed: Feb. 13, 2015

(65) Prior Publication Data
US 2016/0084696 A1 Mar. 24, 2016

(30) Foreign Application Priority Data
Sep. 19, 2014 (TW) ................. 10321667 U

(51) Int. Cl.
*G08B 21/00* (2006.01)
*G01F 23/68* (2006.01)
*G01F 23/00* (2006.01)

(52) U.S. Cl.
CPC ........... *G01F 23/68* (2013.01); *G01F 23/0076* (2013.01); *Y02P 90/02* (2015.11)

(58) Field of Classification Search
CPC ............ G01F 23/68; G08B 5/36; Y02P 90/02
USPC ........................................ 340/623
IPC ........................................ Y02P 90/02
See application file for complete search history.

(56) References Cited

U.S. PATENT DOCUMENTS

| | | | |
|---|---|---|---|
| 4,748,761 A * | 6/1988 | Machovina | A01K 93/02 43/17 |
| 7,562,488 B1 * | 7/2009 | Perkins | A01K 97/125 43/17 |
| 2008/0016749 A1 * | 1/2008 | Priednieks | A01K 89/0108 43/20 |

* cited by examiner

*Primary Examiner* — Mark Rushing
(74) *Attorney, Agent, or Firm* — Koppel, Patrick, Heybl & Philpott

(57) ABSTRACT

A smart electronic float includes: an accelerometer, sensing a movement distance, a movement velocity, movement power, and a sinking gravity of the smart electronic float in water, to produce a corresponding plurality of pieces of float movement data; a microcontroller, receiving the float movement data sensed by the accelerometer; a first wireless communications device, where the microcontroller transmits the float movement data to an electronic device through the first wireless communications device, and receives a light-emitting diode (LED) on/off signal from the electronic device; and an LED, where on/off of the LED is controlled by the microcontroller according to the LED on/off signal.

15 Claims, 3 Drawing Sheets

SMART ELECTRONIC FLOAT, SYSTEM AND METHOD FOR INTEGRATING MOBILE PERSONAL FISHING INFORMATION, AND COMPUTER PROGRAM PRODUCT

RELATED APPLICATIONS

The present application claims priority to Taiwanese Patent Application No. 103216670 filed Sep. 19, 2014.

BACKGROUND

Technical Field

The present invention relates to the field of smart devices, and in particular, to a smart electronic float, a system and a method for integrating mobile personal fishing information, and a computer program product.

Related Art

Modern people have a busy life, and leisure activities are important lifestyles for relieving stress for modern people. A fishing activity can make people walk into the nature and get close to beautiful scenes, and increasingly more people make the leisure activity of fishing become their interest and dig into it.

Currently, for a fishing activity using a float, whether there is a fish approaching a bait is determined only through the action of casting a rod and observing a movement of the float. However, movement determining of the float is absolutely related to personal experience, and also certainly affects the amount of obtained fish, and when the fishing activity is finished, the activity process becomes a memory; meanwhile, at present, such experience only exists in mind, and there is no digital tool to store the experience for review and improvement.

SUMMARY

In view of the above problems, the objectives of the present invention are to provide a smart electronic float, a system and a method for integrating mobile personal fishing information, and a computer program product, which use a modern sensor and smart mobile device to record, analyze, prompt for, and share a fishing activity, so as to make interest and skill of fishing better by such a system.

A first aspect of the present invention provides a smart electronic float, comprising:

an accelerometer, sensing a movement distance, a movement velocity, movement power, and a sinking gravity of the smart electronic float in water, to produce a corresponding plurality of pieces of float movement data;

a microcontroller, receiving the float movement data sensed by the accelerometer;

a first wireless communications device, where the microcontroller transmits the float movement data to an electronic device through the first wireless communications device and receives a light-emitting diode (LED) on/off signal from the electronic device; and an LED, where on/off of the LED is controlled by the microcontroller according to the LED on/off signal.

A second aspect of the present invention provides a system for integrating mobile personal fishing information, comprising:

a smart electronic float, which comprises:

an accelerometer, sensing a movement distance, a movement velocity, movement power, and a sinking gravity of the smart electronic float in water, to produce a corresponding plurality of pieces of float movement data;

an LED;

a first wireless communications device; and a microcontroller, receiving the float movement data sensed by the accelerometer, transmitting the float movement data through the first wireless communications device, and receiving an LED on/off signal, to control on/off of the LED; and an electronic device, which comprises:

an output unit, producing one or more of vibration, flashes, and audios according to an output signal;

a storage unit, used to store a plurality of groups of preset fishing events, where each group of preset fishing events comprises a piece of float data of a fish-approaching-bait event;

a second wireless communications device; and a control unit, receiving the float movement data from the smart electronic float through the second wireless communications device, and comparing the float movement data with the float data, to determine whether the preset fishing event of the fish-approaching-bait event occurs, after the fish-approaching-bait event occurs, sending the output signal to the output unit, and sending the LED on/off signal to the smart electronic float through the second wireless communications device.

A third aspect of the present invention provides a method for integrating mobile personal fishing information, comprising the following steps:

receiving a plurality of pieces of float movement data from a smart electronic float, where the float movement data comprises data of a movement distance, a movement velocity, movement power, and a sinking gravity of the smart electronic float in water;

comparing the float movement data with a piece of fish-approaching-bait float data in a plurality of groups of preset fishing events, and determining whether a fish-approaching-bait event occurs; and when the fish-approaching-bait event occurs, producing an output signal and an LED on/off signal, where one or more of vibration, flashes, and audios are produced according to the output signal, transmitting the LED on/off signal to the smart electronic float, and controlling on/off of an LED of the smart electronic float according to the LED on/off signal.

A fourth aspect of the present invention is a computer program product in which a program is stored, capable of completing the method in the third aspect of the present invention after a system for integrating mobile personal fishing information loads and executes the program.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

To make a person of ordinary skill in the art further understand the present invention, several preferred embodiments of the present invention are particularly listed below with reference to the accompanying drawings to describe in detail the structure of and the efficacy to be achieved by the present invention.

Figure 1:
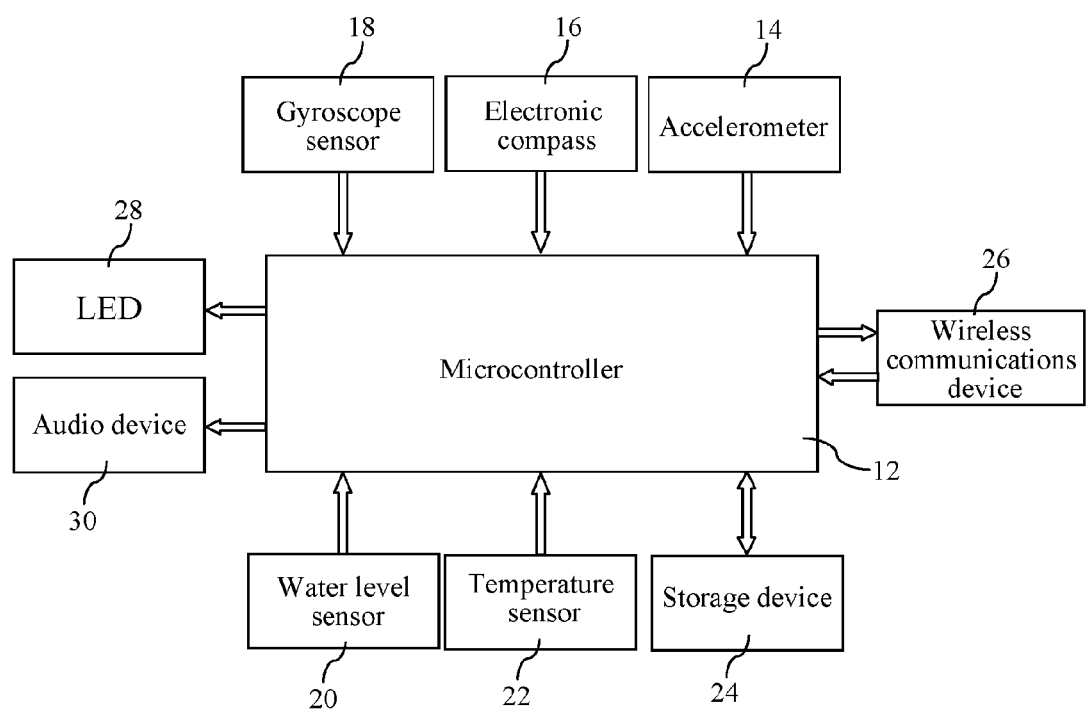
FIG. 1 is a block diagram of a smart electronic float according to the present invention.

FIG. 1 is a block diagram of a smart electronic float according to the present invention. In FIG. 1, the smart electronic float 10 includes a microcontroller 12, an accelerometer 14, an electronic compass 16, a gyroscope sensor 18, a water level sensor 20, a temperature sensor 22, a storage device 24, a wireless communications device 26, an LED 28, and an audio device 30. The communications protocol of wireless communications device 26 could be one of a Bluetooth communication protocol, a WiFi communication protocol, a Z-wave communication protocol, a Z-bee communication protocol and so on, and the audio device 30 could be a speaker, a buzzer, or an ultrasonic wave transmitter.

The accelerometer 14 senses a movement distance, a movement velocity, movement power, and a sinking gravity of the smart electronic float 10 in water, to produce a corresponding plurality of pieces of float movement data. The electronic compass 16 senses a location of the smart electronic float 10, to produce a piece of float location data. The gyroscope sensor 18 senses a posture of the smart electronic float 10 in water, to produce a piece of float posture data. The water level sensor 20 senses whether the smart electronic float 10 is in water, to produce a water level signal. The temperature sensor 22 senses a temperature of the smart electronic float 10 in water, to produce a piece of water temperature data.

The microcontroller 12 receives several pieces of float movement data sensed by the accelerometer 14, including the movement distance, the movement velocity, the movement power, and the sinking gravity of the smart electronic float 10 in water, the float posture data sensed by the gyroscope sensor 18, the float location data sensed by the electronic compass 16, the water temperature data sensed by the temperature sensor 22, and the water level signal sensed by the water level sensor 20, and stores the received various pieces of data in the storage device 24.

The microcontroller 12 transmits the received several pieces of the float movement data, the float posture data, the float location data, the water temperature data, and the water level signal to the electronic device (not shown in the figure) through the wireless communications device 26; or, the microcontroller 12 accesses several pieces of the float movement data, the float posture data, the float location data, the water temperature data, and the water level signal in the storage device 24 and transmits the float movement data, the float posture data, the float location data, the water temperature data, and the water level signal to the electronic device through the wireless communications device 26.

The microcontroller 12 receives an LED on/off signal from the electronic device by the wireless communications device 26, and controls on (long-luminous or flickering) or off of the LED 28 according to the LED on/off signal. The microcontroller 12 receives an audio control signal from the electronic device through the wireless communications device 26, and controls the audio device 30 according to the audio control signal, to output an audio.

Figure 2:
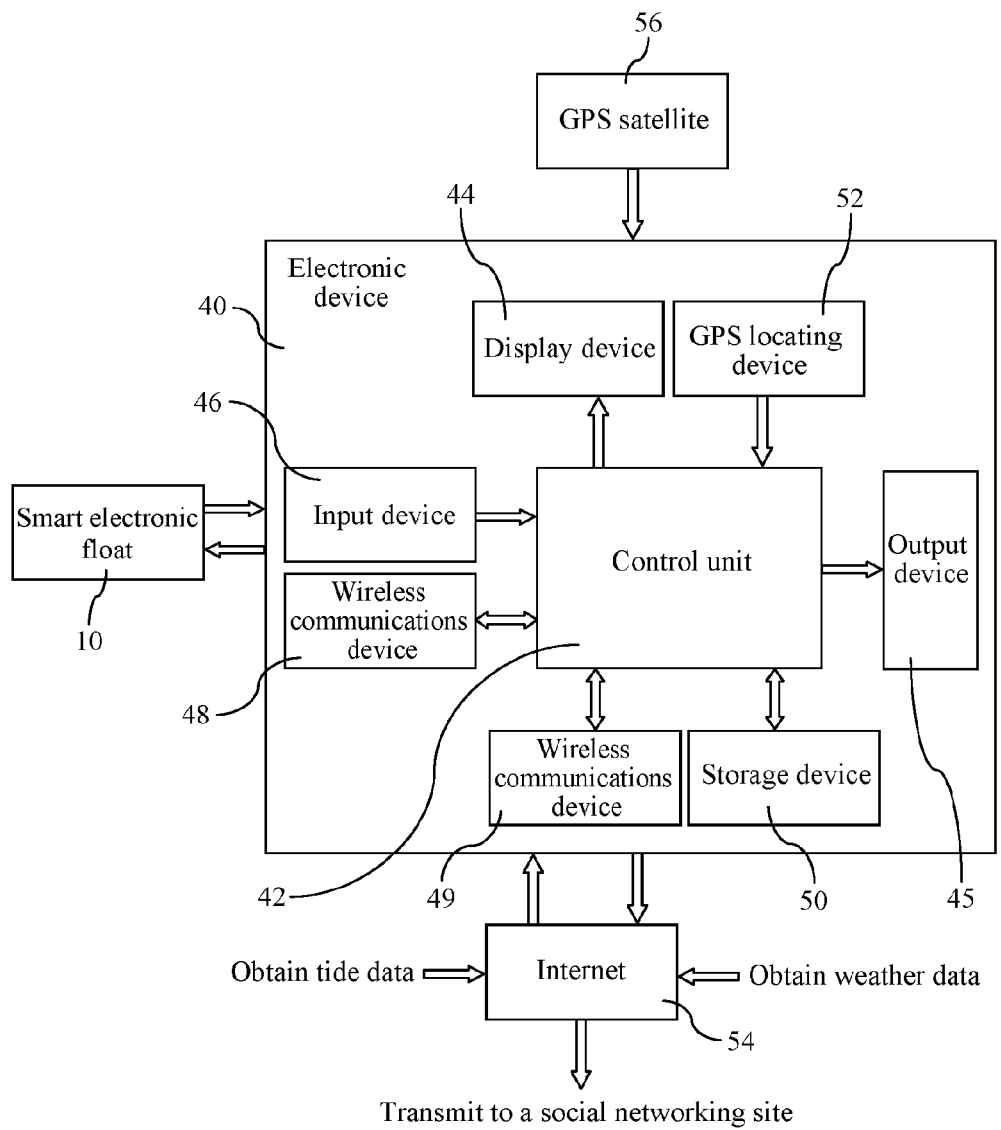
FIG. 2 is a block diagram of a system for integrating mobile personal fishing information according to the present invention.

FIG. 2 is a block diagram of a system for integrating mobile personal fishing information according to the present invention. In FIG. 2, the system for integrating mobile personal fishing information includes a smart electronic float 10 and an electronic device 40. The compositions of the smart electronic float 10 are shown in the above and in FIG. 1. The electronic device 40 is a smart mobile device, and the smart mobile device is a smart phone or a tablet computer.

The electronic device 40 includes a control unit 42, a display device 44, an output device 45, an input device 46, wireless communications devices 48 and 49, a storage device 50, and a Global Positioning System (GPS) locating device 52. The output device 45 is one or more of a vibration unit, a light-emitting unit, and a speaker. The communications protocol of wireless communications devices 48 and 49 could be one of a Bluetooth communication protocol, a WiFi communication protocol, a Z-wave communication protocol, a Z-bee communication protocol and so on.

The wireless communications device 48 performs wireless communication with a wireless communications device 26 of the smart electronic float 10, and the wireless communications device 49 performs wireless communication with the Internet 54. The GPS locating device 52 receives a piece of location data transmitted by a GPS satellite 56, and transmits the location data to the control unit 42.

The control unit 42 receives float movement data, float posture data, float location data, water temperature data, and a water level signal from the smart electronic float 10 through the wireless communications device 48, and receives a piece of weather data and a piece of tide data from the Internet 54 through the wireless communications device 49.

The input device 46 edits, on the display device 44, the float movement data, the float posture data, the float location data, the water temperature data, the water level signal, the location data, the weather data, and the tide data in the control unit 42, and the control unit 42 stores the edited float movement data, float posture data, float location data, water temperature data, water level signal, location data, weather data, and tide data in the storage device 50.

The control unit 42 compares the float movement data, the float posture data, and the float location data received from the smart electronic float 10 with the edited float movement data, float posture data, and float location data in the storage device 50, so as to determine that a fish-approaching-bait event occurs; then the control unit 42 produces an output signal, an LED on/off signal, and an audio control signal; the control unit 42 controls vibration, flashes, or audios of the output device 45 through the output signal, and transmits the LED on/off signal and the audio control signal to the smart electronic float 10 through the wireless communications device 48.

The input device 46 edits, on the display device 44, a piece of shared data (for example, photos and fishing experience) in the control unit 42, and transmits the shared data to the Internet 54 through the wireless communications device 49, so as to transmit the shared data to a social networking site for sharing. The control unit 42 accesses the edited shared data in the storage device 50.

Figure 3:
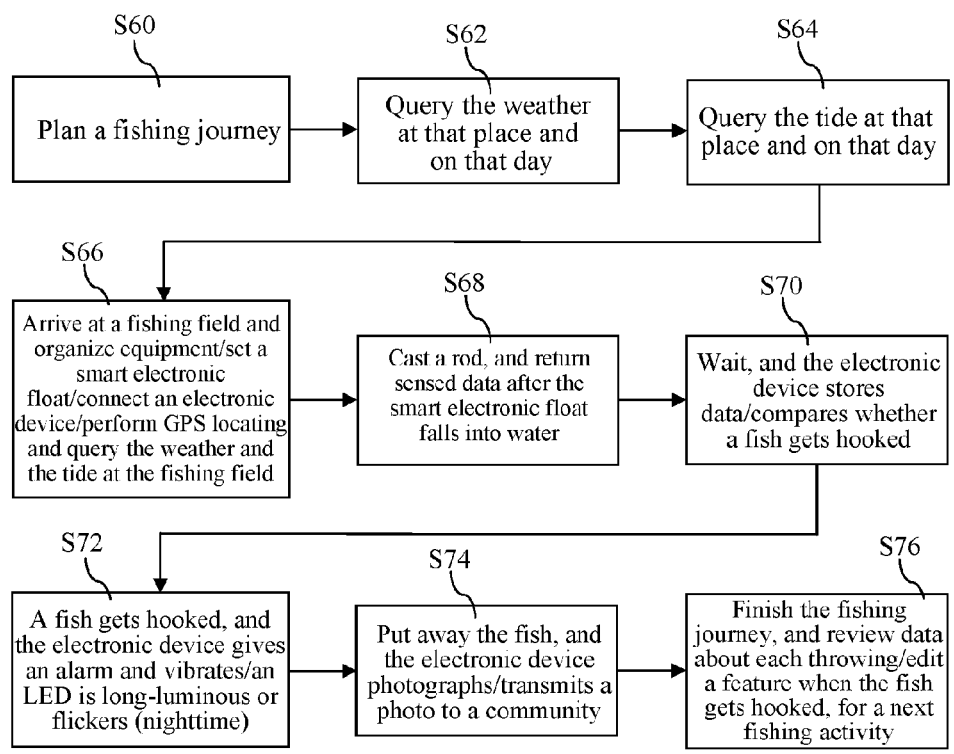
FIG. 3 is a flowchart of a method for integrating mobile personal fishing information according to the present invention.

FIG. 3 is a flowchart of a method for integrating mobile personal fishing information according to the present invention. Reference is made to components in FIG. 1 and FIG. 2 when processes and steps in FIG. 3 are described.

In FIG. 3, a fisherman uses an input device 46 of an electronic device 40 to plan a fishing journey on a display device 44 (step S60), for example, a date, a time, a fishing location, means of transport, and preparation of a fishing tackle and baits, and a control unit 42 stores the planned fishing journey in a storage device 50.

The fisherman queries the weather at the place and on the day of fishing in advance, that is, the fisherman uses an input device 46 of the electronic device 40 to input query of the weather at the place and on the day of fishing to the control unit 42, the control unit 42 queries the Internet 54 for data about the weather at the place and on the day of fishing through a wireless communications device 49, the Internet 54 returns the weather data to the control unit 42, and the control unit 42 displays the weather data on the display device 44 and stores the weather data in the storage device 50 (step S62).

The fisherman queries the tide at the place and on the day of fishing in advance, that is, the fisherman uses the input device 46 of the electronic device 40 to input query of the tide at the place and on the day of fishing to the control unit 42, the control unit 42 quires the Internet 54 for data about the tide at the place and on the day of fishing through the wireless communications device 49, the Internet 54 returns the tide data to the control unit 42, and the control unit 42 displays the tide data on the display device 44 and stores the tide data in the storage device 50 (step S64).

After arriving at a fishing field, the fisherman starts to organize equipment, and mounts a smart electronic float 10 on a fishing rod, and sets the smart electronic float 10, for example, starts a power supply of the smart electronic float 10; the fisherman connects the electronic device 40, that is, the control unit 42 of the electronic device 40 connects a wireless communications device 48 and the wireless communications device 49 respectively to the wireless communications device 26 of the smart electronic float 10 and the Internet 54; the fisherman performs GPS locating and query on the electronic device 40, that is, a GPS locating device 52 and a GPS satellite 56 perform locating, and the GPS locating device 52 receives a piece of location data transmitted by the GPS satellite 56 and transmits the location data to the control unit 42; the fisherman instantly queries the weather and the tide of the fishing field, that is, the input device 46 of the electronic device 40 is used to input query of the instant weather and tide of the fishing field to the control unit 42, the control unit 42 queries the Internet 54 for data about the instant weather and tide through the wireless communications device 49, the Internet 54 returns the weather and tide data to the control unit 42, and the control unit 42 displays the instant weather and tide data on the display device 44 and stores the instant weather and tide data in the storage device 50 (step S66).

The fisherman casts the fishing rod mounted with the smart electronic float 10, after the smart electronic float 10 falls into water, a microcontroller 12 of the smart electronic float 10 starts to transmit received float movement data sensed by an accelerometer 14, float posture data sensed by a gyroscope sensor 18, float location data sensed by an electronic compass 16, water temperature data sensed by a temperature sensor 22, and a water level signal sensed by the water level sensor 20 to the electronic device 40 through the wireless communications device 26, and the microcontroller 12 stores the foregoing received data in the storage device 24 (step S68). When the power supply of the smart electronic float 10 is started, the microcontroller 12 may start to transmit the data sensed by each sensor to the electronic device 40; or, after the smart electronic float 10 falls into water, when the microcontroller 12 receives the water level signal of the water level sensor 20, the microcontroller 12 starts to transmit the data sensed by each sensor to the electronic device 40, which can achieve the purpose of power saving.

In a process of waiting for a fish to get hooked, the microcontroller 12 receives the float movement data, the float posture data, the float location data, the water level data, and the water temperature data of the water level sensor received by the control unit 42 of the electronic device 40 from the smart electronic float 10, and stores the data in the storage device 50, and the control unit 42 compares the received data with edited float movement data, float posture data, and float location data corresponding to a fish-approaching-bait event in the storage device 50, to determine whether a fish-approaching-bait event occurs (step S70).

When a fish approaches a bait, the received float movement data, float posture data, and float location data may also be compared with the edited float movement data, float posture data, and float location data corresponding to the fish-approaching-bait event in the storage device 50 by the control unit 42, to determine that a fish-approaching-bait event occurs; then the control unit 42 of the electronic device 40 produces an output signal; the control unit 42 controls vibration, flashes, or audios of the output device 45 by the output signal, and the control unit 42 produces an LED on/off signal enabling an LED 28 to be long-luminous or flicker and an audio control signal enabling an audio device 30 to produce an audio, and transmits the LED on/off signal and the audio control signal to the smart electronic float 10 through the wireless communications device 48. The microcontroller 12 of the smart electronic float 10 transmits the LED on/off signal and the audio control signal from the electronic device 40 through the wireless communications device 26, the microcontroller 12 controls the LED 28 to be long-luminous or flicker, and the microcontroller 12 controls the audio device 30 to produce an audio (step S72).

When a fish is hooked, and the rod is put away, the fisherman uses a photographing function of the electronic device 40 to photograph the hooked fish, the input device 46 may edit or typeset the photographed photo, and the control unit 42 transmits the edited or typeset photo to the Internet 54 through the wireless communications device 49, so as to transmit the photo to a social networking site to share fishing photos. The control unit 42 stores the edited or typeset photo in the storage device 50 (step S74).

After the fishing journey is finished, the fisherman displays, on the display device 44, various pieces of data stored in the storage device 50, and each time the smart electronic float 10 is thrown, reviews the various pieces of data transmitted by the smart electronic float 10 in the case of waiting for a fish to get hooked and for the fish-approaching-bait event, the input device 46 edits, on the display device 44, the float movement data, the float posture data, and the float location data in the case of waiting for a fish to get hooked and for the fish-approaching-bait event, and the control unit 42 stores the edited data in the storage device 50, so as to be used as comparison data of whether an approaching-bait event occurs for a fish during a next fishing activity (step S76).

The foregoing method of the present invention can be completed by a computer program product in which a program is stored, and when the system for integrating mobile personal fishing information, for example, downloads the program from a network and executes the program, the steps in the method shown in the foregoing descriptions and drawings can be completed.

The present invention provides a smart electronic float, a system and a method for integrating mobile personal fishing information, and a computer program product, and the advantages thereof are using a modern sensor and smart mobile device to record, analyze, prompt for, and share a fishing activity, so as to make the interest and skill of fishing better by such a system.

Although the present invention is described above with reference to the preferred embodiments and the exemplary drawings, the embodiments should not be regarded as a limitation to the present invention. Any modifications, omissions and variations on the content of the forms and specific examples made by a person skilled in the art shall fall within the scope defined by the claims of the present invention.

What is claimed is:

1. A smart electronic float, used to be connected to an electronic device, comprising:
   an accelerometer, sensing at least a fish hooked acceleration and a sinking gravity of the smart electronic float in water, to produce a corresponding plurality of pieces of float movement data;
   a microcontroller, receiving the float movement data sensed by the accelerometer;
   a first wireless communications device, wherein the microcontroller transmits the float movement data to the electronic device through the first wireless communications device and receives a light-emitting diode (LED) on/off signal from the electronic device; and
   an LED, wherein on/off of the LED is controlled by the microcontroller according to the LED on/off signal.

2. The smart electronic float according to claim 1, further comprising:
   a gyroscope sensor, sensing a posture of the smart electronic float in water, to produce a piece of float posture data;
   an electronic compass, sensing a location of the smart electronic float, to produce a piece of float location data;
   a temperature sensor, sensing a temperature of the smart electronic float in water, to produce a piece of water temperature data; and
   a water level sensor, sensing whether the smart electronic float is in water, to produce a water level signal,
   wherein the microcontroller receives the float posture data sensed by the gyroscope sensor, the float location data sensed by the electronic compass, the water temperature data sensed by the temperature sensor, and the water level signal sensed by the water level sensor, and transmits the float posture data, the float location data, the water temperature data, and the water level signal to the electronic device by the first wireless communications device.

3. The smart electronic float according to claim 2, further comprising a first storage device, wherein the microcontroller accesses the float movement data, the float posture data, the float location data, the water temperature data, and the water level signal in the first storage device.

4. The smart electronic float according to claim 1, further comprising an audio device, wherein audio output by the audio device is controlled by the microcontroller according to an audio control signal, wherein the microcontroller receives the audio control signal from the electronic device through the first wireless communications device.

5. A system for integrating mobile personal fishing information, comprising:
   a smart electronic float, which comprises:
     an accelerometer, sensing at least a fish hooked acceleration and a sinking gravity of the smart electronic float in water, to produce a corresponding plurality of pieces of float movement data;
     a light-emitting diode (LED);
     a first wireless communications device; and
     a microcontroller, receiving the float movement data sensed by the accelerometer, transmitting the float movement data through the first wireless communications device, and receiving an LED on/off signal, to control on/off of the LED; and
   an electronic device, which comprises:
     an output unit, producing one or more of vibration, flashes, and audios according to an output signal;
     a storage unit, used to store a plurality of groups of preset fishing events, wherein each group of preset fishing events comprises a piece of float data of a fish-approaching-bait event;
     a second wireless communications device; and
     a control unit, receiving the float movement data from the smart electronic float through the second wireless communications device, and comparing the float movement data with the float data, to determine whether the preset fishing event of the fish-approaching-bait event occurs, after the fish-approaching-bait event occurs, sending the output signal to the output unit, and sending the LED on/off signal to the smart electronic float through the second wireless communications device.

6. The system for integrating mobile personal fishing information according to claim 5, wherein the smart electronic float further comprises:
   a gyroscope sensor, sensing a posture of the smart electronic float in water, to produce a piece of float posture data;
   an electronic compass, sensing a location of the smart electronic float, to produce a piece of float location data;
   a temperature sensor, sensing a temperature of the smart electronic float in water, to produce a piece of water temperature data; and
   a water level sensor, sensing whether the smart electronic float is in water, to produce a water level signal,
   wherein the microcontroller receives the float posture data sensed by the gyroscope sensor, the float location data sensed by the electronic compass, the water temperature data sensed by the temperature sensor, and the water level signal sensed by the water level sensor, and transmits the float posture data, the float location data, the water temperature data, and the water level signal to the electronic device by the first wireless communications device, and the electronic device compares the data with the fish-approaching-bait float data.

7. The system for integrating mobile personal fishing information according to claim 5, wherein the smart electronic float further comprises an audio device; and after the fish-approaching-bait event occurs, the control unit sends an audio control signal to the smart electronic float through the second wireless communications device, and the microcontroller controls the audio device according to the audio control signal, to produce an audio.

8. The system for integrating mobile personal fishing information according to claim 5, wherein each group of preset fishing events further comprises a piece of weather data, a piece of tide data, and a piece of location data.

9. The system for integrating mobile personal fishing information according to claim 8, wherein the electronic device further comprises: a display unit, used to display the stored plurality of groups of preset fishing events, so as to use an input device for edition; and the control unit stores the edited plurality of groups of preset fishing events in the storage device.

10. The system for integrating mobile personal fishing information according to claim 9, wherein after comparing the float movement data with the float data, in the case in which the fish-approaching-bait event is not met, the control device displays a piece of prompt information at the display unit, so as to use the input device to edit a newly added preset fishing event.

11. A method for integrating mobile personal fishing information, used in an electronic device, and comprising the following steps:

receiving a plurality of pieces of float movement data from a smart electronic float, wherein the float movement data comprises data of at least a fish hooked acceleration and a sinking gravity of the smart electronic float in water;

comparing the float movement data with a piece of float data in a corresponding fish-approaching-bait event in a plurality of groups of preset fishing events, and determining whether the fish-approaching-bait event occurs; and when the fish-approaching-bait event occurs, producing an output signal and a light-emitting diode (LED) on/off signal, wherein one or more of vibration, flashes, and audios are produced according to the output signal, transmitting the LED on/off signal to the smart electronic float, and controlling on/off of an LED of the smart electronic float according to the LED on/off signal.

12. The method for integrating mobile personal fishing information according to claim 11, wherein the float movement data further comprises a piece of float posture data, a piece of float location data, a piece of water temperature data, and a water level signal.

13. The method for integrating mobile personal fishing information according to claim 11, further comprising the following steps:

obtaining a piece of weather data and a piece of tide data from the Internet, and obtaining a piece of location data from a global positioning system (GPS) satellite; and storing the float movement data corresponding to the fish-approaching-bait event, the weather data, the tide data, and the location data.

14. The method for integrating mobile personal fishing information according to claim 11, further comprising the following steps:

editing the float movement data corresponding to the fish-approaching-bait event, the weather data, the tide data, and the location data, wherein the float data is the edited float movement data;

storing the edited data corresponding to the fish-approaching-bait event.

15. A computer program product, in which a non-transitory program is stored, the non-transitory program capable of completing the method according to claim 11 after a system for integrating mobile personal fishing information loads and executes the non-transitory program.

* * * * *